United States Patent [19]

Janisch

[11] Patent Number: 4,878,969
[45] Date of Patent: Nov. 7, 1989

[54] PROCESS FOR PRODUCING AN ELECTRICALLY INSULATING SHEATHING AROUND A JUNCTION BETWEEN ELECTRICALLY CONDUCTIVE ELEMENTS

[75] Inventor: Erich R. Janisch, Heideck, Fed. Rep. of Germany

[73] Assignee: Erich Janisch Kunstoffe, Heideck, Fed. Rep. of Germany

[21] Appl. No.: 196,467

[22] Filed: May 20, 1988

Related U.S. Application Data

[63] Continuation of Ser. No. 909,859, Sep. 22, 1986, abandoned.

[30] Foreign Application Priority Data

Oct. 18, 1985 [DE] Fed. Rep. of Germany ....... 3537167

[51] Int. Cl.$^4$ ................... H01B 13/06; H01B 13/08
[52] U.S. Cl. ........................... 156/49; 156/52; 156/53; 156/73.1; 156/73.2; 156/73.6; 156/213; 156/250; 174/84 R; 428/212; 428/217; 428/518
[58] Field of Search .................. 156/49, 52, 53, 73.1, 156/73.4, 73.2, 73.6, 306.6, 309.6, 324.4, 213, 215, 250; 174/84 R; 428/212, 217, 424.6, 518

[56] References Cited

U.S. PATENT DOCUMENTS

| | | | |
|---|---|---|---|
| 652,975 | 7/1900 | Newbury | 156/251 X |
| 2,852,423 | 9/1958 | Bassett | 156/53 X |
| 3,033,727 | 5/1962 | Cram et al. | 156/53 X |
| 3,239,396 | 3/1966 | Bohannon | 156/52 |
| 3,274,037 | 9/1966 | Nixon | 156/73.1 |
| 3,361,605 | 1/1968 | Gilbert | 156/49 X |
| 3,475,264 | 10/1969 | Donaldson | 156/309.6 X |
| 3,669,824 | 6/1972 | Hess | 156/53 X |
| 3,749,620 | 7/1973 | Montgomery | 156/73.1 |
| 3,814,139 | 6/1974 | Loyd et al. | 174/84 R X |
| 3,833,755 | 9/1974 | Soelberg | 156/52 X |
| 3,879,239 | 4/1975 | Rager et al. | 156/73.1 X |
| 4,062,998 | 12/1977 | Hagiwara et al. | 428/380 X |
| 4,067,105 | 1/1978 | Zahn et al. | 174/84 C |
| 4,228,215 | 10/1980 | Hein et al. | 428/424.6 X |
| 4,370,374 | 1/1983 | Raabe et al. | 156/324.4 X |

Primary Examiner—Robert A. Dawson
Attorney, Agent, or Firm—Walter C. Farley

[57] ABSTRACT

In a process and a material for producing an electrically insulating sheathing around a junction between electrically conductive elements, the material comprises first and second layers which have different melting points and which are disposed around the junction in such a way that the layer having the lower melting point constitutes an inner layer around the junction while the layer having the higher melting point is disposed on the outside of the inner layer. The material is pressed around the junction by means of ultrasound welding, with the inner layer softening at least to such an extent that, under the pressure applied thereto by the outer layer, the inner layer fills any spaces between the junction and the outer layer, and the outer layer forming a sealing enclosure around the inner layer and the junction.

11 Claims, 2 Drawing Sheets

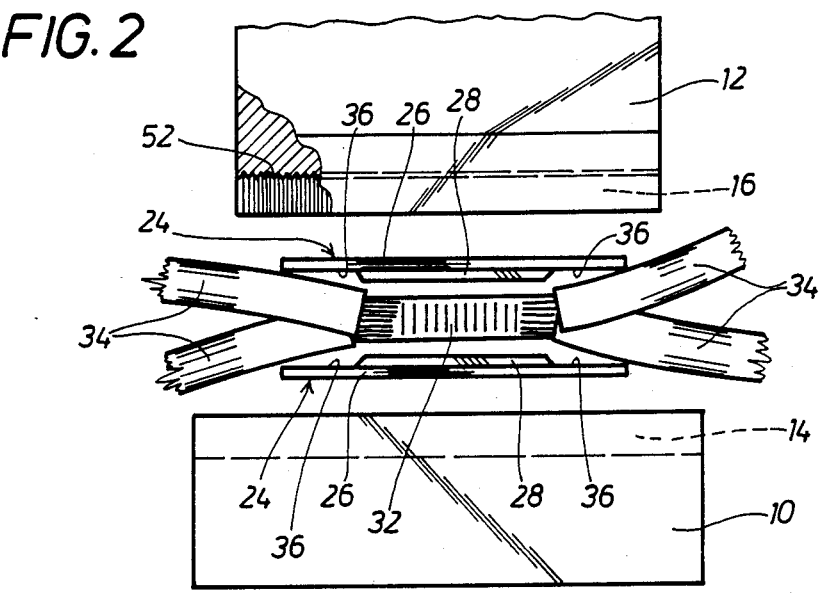
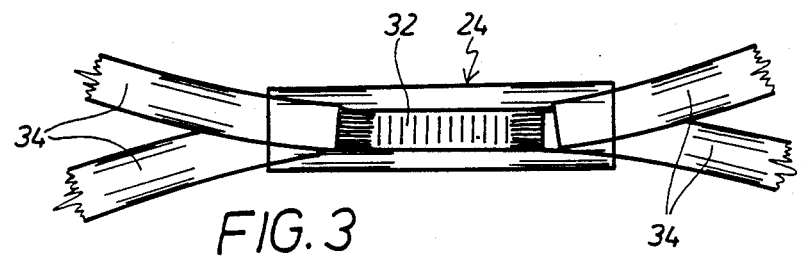
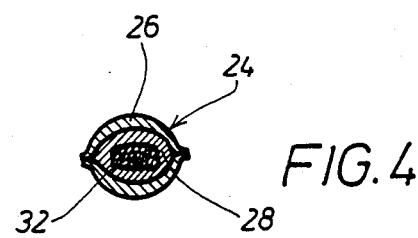

PROCESS FOR PRODUCING AN ELECTRICALLY INSULATING SHEATHING AROUND A JUNCTION BETWEEN ELECTRICALLY CONDUCTIVE ELEMENTS

RELATED APPLICATION

This application is a continuation of my application Ser. No. 909,859, filed Sept. 22, 1986, now abandoned.

BACKGROUND OF THE INVENTION

The invention relates generally to a process for electrically insulatingly enclosing a junction between electrically conductive elements, and a material for use in carrying out such a process.

In one form of process for producing an electrically insulating sheathing around the junction between electrically conductive elements such as wires, an electrically insulating sheathing material is arranged around the junction by means of an ultrasound welding operation, thereby to cover the junction. As indicated, the electrically conductive elements which are joined together and then sheathed in that manner may be for example wires in electrical equipment, which are connected together for example by means of an ultrasound welding apparatus. In order to join the electrically conductive elements, it is first necessary to strip the insulation from those elements at the location at which the elements are to be joined together. The elements are then welded together along the location at which they are to be connected, for example by means of the ultrasound welding apparatus referred to above. After the ultrasound welding operation has been carried out, then electrical insulation around the junction must be restored in order not to leave electrically live components exposed. The electrically insulating sheathing around the junction must not only have a certain level of dielectric strength and a given specific resistance, but it must also be resistant to temperature and furthermore it must be satisfactorily sealed. The sealed nature of the sheathing around the junction between the electrically conductive elements is necessary in order to afford protection against the ingress of moisture which would have an adverse effect on the junction between the electrically conductive elements, that is to say, it would increase the contact or transfer resistance, due to the resulting corrosion or oxidation caused by the moisture which penetrated into the junction. One form of the process for electrically insulating enclosing a junction between electrically conductive elements provides that a self-adhesive strip of insulating material is wound around the junction. However, it will be appreciated that the operation of winding the strip of insulating material around the junction takes up a relatively large amount of time, with the result of high labor costs. In another form of such a process for electrically insulatingly enclosing a junction between electrically conductive elements, a plastic material is injected around the junction. That operation requires an injection molding tool which must be arranged around the junction to be enclosed. The sheathing of plastic material which is injected around the junction in that way is of relatively large wall thickness in order to ensure that the sheathing has the necessary electrical properties. However, because of the relatively large wall thickness of the sheathing injected around the junction, in which respect the material used may be for example polyvinyl chloride, such a sheathing suffers from the disadvantage that problems may be encountered when the joined electrically conductive elements have to be inserted into a duct. Another process for producing an electrically insulating sheathing around a junction between electrically conductive elements involves using a shrink tube which is caused to shrink around the junction by virtue of heat being appropriately applied to the tube. However, such a sheathing configuration suffers from the disadvantage that it is not possible completely to avoid cavities being formed between the electrically insulating sheathing and the junction between the electrically conductive elements, so that the junction is not reliably protected from the effects of corrosion and oxidation. The same difficulties are also encountered when using another form of process for producing an electrically insulating sheathing around a junction between electrically conductive elements, which involves arranging an insulating film or foil around the junction, being fixed in position by means of an ultrasound welding operation. That process also does not make it possible to reliably avoid the formation of cavities between the electrically conductive elements and the electrically insulating sheathing with the result that moisture can penetrate into such cavities and thus give rise to corrosion and oxidation, with the above-indicated detrimental consequences. Thus, such chemical changes at the junction as are caused by corrosion and oxidation phenomena can cause the contact resistance of the junction between the elements to reach unacceptable high levels.

SUMMARY OF THE INVENTION

An object of the present invention is to provide a process for electrically insulatingly encasing a junction between electrically conductive elements in a simple and easily performed operation.

Another object of the present invention is to provide a process for enclosing a junction between electrically conductive elements so as to afford electrical insulation therearound which is at least substantially matched to that of insulation on said elements.

Yet another object of the present invention is to provide a process for electrically insulatingly enclosing a junction between first and second electrically conductive elements which reliably eliminates cavities between the enclosing material and the junction of the elements.

A further object of the present invention is to provide a sheathing material for use in enclosing a junction between electrically conductive elements, which provides at least substantially equal electrical insulation.

A still further object of the present invention is to provide a material for electrically insulatingly enclosing a junction between electrically conductive components, which is resistant to the ingress of moisture and other contaminating material into said junction.

Yet a further object of the invention is to provide a material for electrically insulatingly enclosing a junction between electrically conductive elements, which can be applied in a quick and simple fashion and which gives an adequately sealed enclosure around the junction.

In accordance with the present invention, these and other objects are achieved by a process for electrically insulatingly enclosing a junction between electrically conductive elements by means for an electrically insulating sheathing material which is fitted around the junction by means of ultrasound welding. The sheathing material comprises first and second layers of material with different melting temperatures, and it is arranged over the junction in such a way that the first layer having the lower melting temperature is towards the junction and the second layer having the higher melting temperature is around and thus outside the first layer which has the lower melting temperature. The sheathing material consisting of the first and second layers is then pressed around the junction by means of ultrasound welding, the first layer which has the lower melting temperature thus softening at least to such a degree that it fills the space between the junction and the second layer which is outside the first layer and which thus presses against the first or inner layer and holds it in position. The second layer which has the higher melting temperature thus sealingly encloses the junction relative to the exterior.

As indicated above, the use of a sheathing material which comprises first and second layers with different melting temperatures and which is arranged around the junction in such a way that the material having the lower melting temperature forms an inner layer disposed between the junction and the outer layer gives the advantage that when the sheathing material is pressed around the junction by the application of ultrasound welding, the inner layer softens to such an extent as to fill the space between the junction and the outer layer of material. The inner layer of material is thus pressed into any cavities which may occur between the junction and the outer layer of material, thereby filling such cavities in such a way that the electrically insulating sheathing which is thus formed around the junction affords very good protection from the penetration of moisture into the assembly. In the same operation as that in which the inner layer is softened so as to fill the cavities between the junction and the outer layer, the outer layer which has a higher melting temperature is also pressed around the junction in such a way that it comes to bear snugly against the insulation on the electrically conductive elements at respective sides of the junction, so that the junction is thus also sealed relative to the exterior at the point at which the electrically insulating sheathing material meets the insulation already provided on the electrically conductive elements.

In accordance with a preferred feature of the invention, the material for producing the electrically insulating sheathing around the junction may be arranged at two oppositely disposed sides of the junction, and extending over the junction. In that form of the process therefore, the operation of enclosing the junction involves using two portions of sheathing material which each comprise first and second layers, with the second layer having a higher melting point than the first layer. The layer having the lower melting point in each portion is so arranged as to be on the side towards the junction, that is to say, the layer having the lower melting point is disposed between the junction and the other layer which thus forms the outer layer when the sheathing is produced. Thus, the two portions of sheathing material are brought into contact with each other around the junction at respective sides of the junction, using ultrasound welding in the above-indicated manner. After the two outer layers have been satisfactorily joined, thereby completing the sheathing or enclosing effect, the outer layers are cut off in the lengthwise direction thereof, laterally beside the junction, to remove any projecting pieces of material that extend laterally from the junction.

In another feature of the process according to the invention, the sheathing material is a portion which is wound around the junction with the layer having the lower melting temperature being disposed towards the junction and thus forming the inner layer. That form of the process therefore uses only one piece of sheathing material which comprises the first and second layers, as indicated above. One advantage of this form of the process is that, after the junction has been sheathed by the application of ultrasound welding, the sheathing material produces only one cut edge, in contrast to the above-indicated form of the process which uses two portions of material and which thus has two cut edges at respective sides of the junction. This form of the process therefore has the advantage that the amount of space required to accommodate the sheathing is further reduced.

In a preferred aspect of the invention, the sheathing material is in the form of a strip and is fed to the junction in a direction which is at least substantially perpendicular to the longitudinal direction of the junction, while the strip of material, after the junction has been enclosed therewith by the application of ultrasound welding, is cut off laterally beside the junction in the transverse direction of the strip of material. That step of cutting off the strip of material and thus trimming it to minimise the bulk of the sheathing around the junction is carreid out directly after the junction has been enclosed with the material by the application of ultrasound welding. For that purpose, the ultrasound welding apparatus may be provided with at least one cutting edge, to perform the severing operation.

As will be seen hereinafter in relation to a specific embodiment of the process according to the present invention, that process can afford the advantages that the operation of producing the electrically insulating sheathing around the junction between electrically conductive elements can be carried out very quickly, thus saving on labor time and thus labor costs, and that the use of a sheathing material consisting of first and second layers with different melting temperatures means that it is possible to provide a sealed enclosure around the junction, while reliably minimizing the occurrence of cavities between the conducting elements and the electrically insulating sheathing. That construction thus ensures that the sheathing around the junction is substantially resistant to the penetration of moisture.

It may be noted at this stage that the electrically conductive elements which are to be sheathed by the process according to the invention may be for example solid wires or stranded wires and same may be joined more particularly by the application of ultrasound welding. It should be appreciated however that the process of the invention may also be used in relation to other forms of junction between electrically conductive elements of various kinds, for example soldered junctions between wires, or soldered or ultrasound-welded junctions between wires and terminal lugs, and the like.

In accordance with another aspect of the present invention, a sheathing material for use in the method of the invention comprises first and second layers, with the second layer being of a material which has a higher melting point than the first layer. The first and second layers are connected together to form an integral or one-piece material which is preferably in strip form, with the width of the first layer which has the lower melting point being smaller than the width of the second layer which has the higher melting point. The fact that the first and second layers are joined together to give an integral material means that the material is easy to handle, insofar as it can be handled as a single piece of material. The fact that the first and second layers of the sheathing material are of different widths means that the second layer which has a higher melting point and which thus constitutes the outer layer of the sheathing provided around the junction between the electrically conductive elements can bear sealingly against the insulation on those elements, by means of the edge portions of the second layer which thus project beyond the respective edges of the first layer, by virtue of the differences in width. As outlined above in relation to the process according to the invention, the first layer which is of a lower melting point can at least substantially fill the spaces between the junction between the conductive elements and the outer layer formed by the material having the higher melting point, while it may be noted that any excess of material forming the first layer may escape between the insulation on the electrically conductive elements and the second outer layer at the point at which that insulation and the second outer layer meet. That ensures that moisture cannot penetrate between electrically conductive elements which are disposed in juxtaposed relationship, and thus reach the junction between the electrically conductive elements.

In a preferred feature of the sheathing material according to the invention, the relative arrangement of the first and second layers with respect to each other is such that the second layer which has the higher melting point projects beyond the first layer which has the lower melting point, at both of the longitudinal edges of the strip-like sheathing material. That configuration ensures that the second layer which thus forms the outer layer of the sheathing bears sealingly against the insulation on the electrically conductive elements, at both of the oppositely disposed sides or ends of the junction. The inner layer of sheathing material is thus enclosed by the outer layer, in all directions.

In another feature of the sheathing material according to the invention, the second layer which is of a higher melting point is of greater hardness than the first layer. It is also advantageous for the second layer which has the higher melting point to have a smoother surface than the first layer, so that the sheathing material can be easily fitted into the ultrasound welding apparatus to carry out the ultrasound welding operation, as the surface of the second layer which is thus the outside surface of the sheathing can slip readily relative to the adjoining surfaces of the apparatus. The fact that the first or inner layer which is thus towards the junction between the electrically conductive elements has a higher coefficient of friction means that the sheathing material can be positioned with a very high degree of accuracy relative to the junction to be sheathed thereby, and will satisfactorily remain in the position in which it was put around the junction, in order then to carry out the ultrasound welding operation.

In an advantageous feature of the present invention, the layer having the lower melting temperature is preferably a coating on the other layer which has the higher melting temperature.

In another feature of the invention, at least the second layer which has the higher melting temperature may be transparent, thus giving the advantage that quality control in respect of the sheathing around the junction between electrically conductive elements can be carried out using the naked eye, insofar as the transparency of the outer layer means that the naked eye can readily ascertain that the space or cavities between the junction of the electrically conductive elements and the second or outer layer of the sheathing material is completely filled with the material constituting the inner layer. The inner layer which has the lower melting point may also be transparent but in another embodiment the inner layer may be colored. Making the outer layer transparent and the inner layer colored affords an easy way of ascertaining that the space between the junction and the outer transparent layer is completely filled with the material of the inner layer, thus giving a moisture-proof sheathing around the junction, as the coloring of the inner layer will facilitate quality control designed to ensure that the material of the inner layer has thoroughly penetrated throughout the interior of the outer layer.

The outer layer comprising the material with a higher melting temperature is preferably a hardened polyvinyl chloride with a hardness value of 90±5 Shore A while the inner layer is preferably a high temperature-resistant soft polyvinyl chloride having a hardness value of 50±5 Shore A.

Further objects, features and advantages of the method and material according to the invention will be apparent from the following description.

BRIEF DESCRIPTION OF THE DRAWINGS

FIG. 2 is a front view of the arrangement shown in FIG. 1, viewing in the direction indicated by the arrow I therein, FIG. 3 is a side view of a junction between electrically conductive elements, of which only portions are shown, together with an electrically insulating sheathing therearound, and FIG. 4 is a view in cross-section through the junction with sheathing shown in FIG. 3.

DESCRIPTION OF THE PREFERRED EMBODIMENT

Figure 1:
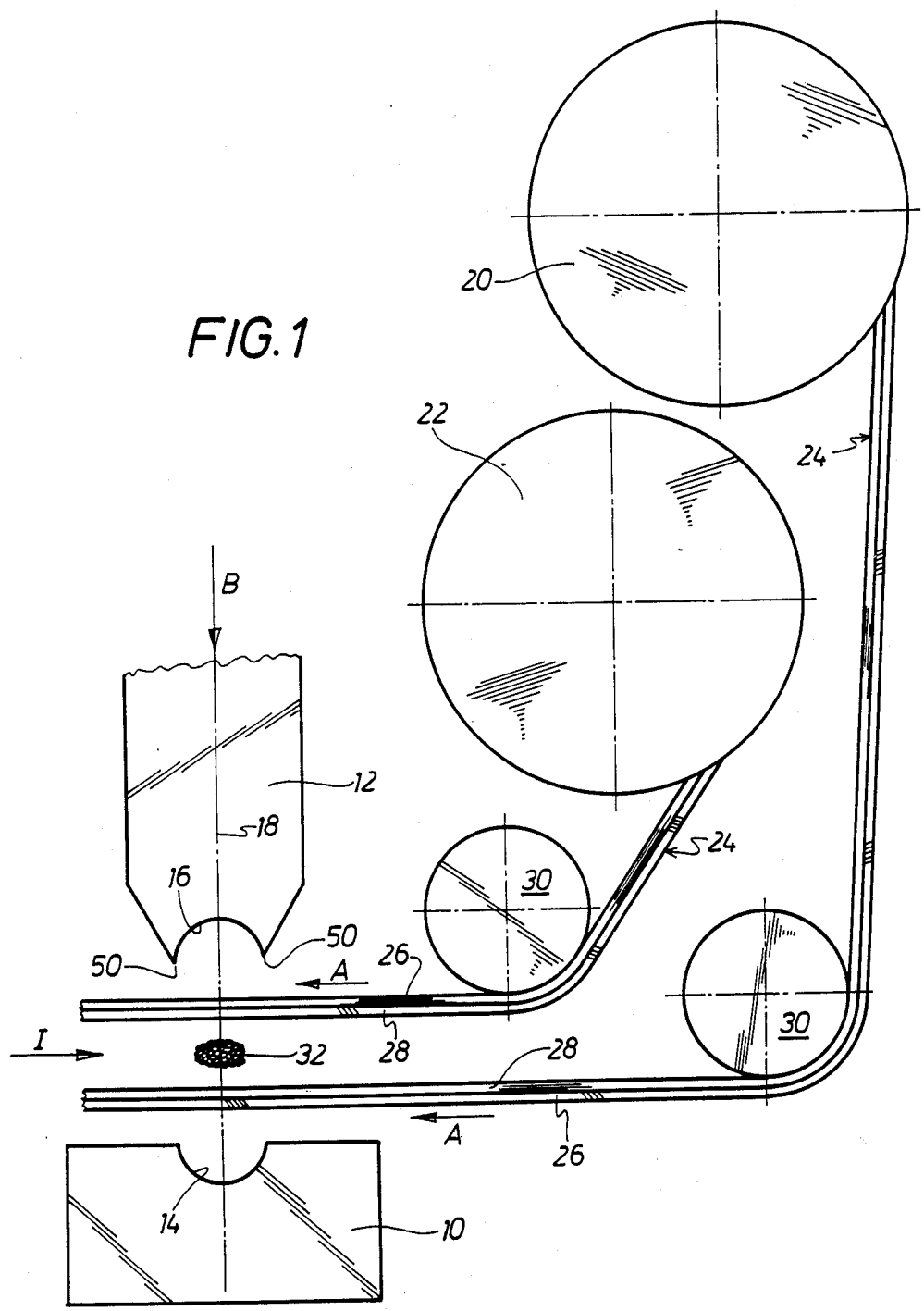
FIG. 1 is a side view of an apparatus for producing an electrically insulating sheathing around a junction between electrically conductive elements.

Referring firstly to FIGS. 1 and 2, shown therein is a diagrammatic side view of an ultrasound welding apparatus for carrying out the process of producing a sealed sheathing around the junction between first and second electrically sheathing elements. The apparatus shown in FIGS. 1 and 2 comprises an anvil 10 and an ultrasound welding tool referred to as a sonotrode 12. The anvil 10 has a recess as indicated at 14 while the sonotrode 12 has a corresponding recess 16. As can be clearly seen from FIG. 1, the recesses 14 and 16 are in mutually oppositely disposed relationship and are aligned with each other along a dash-dotted line indicated at 18 in FIG. 1.

The apparatus further comprises first and second supply devices 20 and 22 which are in the form of supply rolls. Wound on to each of the supply rolls 20 and 22 is a respective strip of sheathing or encasing material 24, comprising first and second layers 28 and 26 which have different melting temperatures. The two strips of dual-layer sheathing material 24 are unwound from the supply rolls 20 and 22 and then passed around direction-changing rollers 30 in such a way that the two strips of material 24 are advanced in the direction indicated by the arrows A in FIG. 1 between the anvil 10 and the sonotrode 12, transversely with respect to the direction of elongation of the respective recesses 14 and 16. The elongate configuration of the respective recesses 14 and 16 can be clearly seen from FIG. 2.

The strips of sheathing material 24 are aligned between the anvil 10 and the sonotrode 12 in such a way that the two layers 28 having the lower melting temperature are towards the junction as indicated at 32 between first and second electrically conductive elements 34, portions of which are shown in FIG. 2.

When the two strips of material 24 have been disposed between the anvil 10 and the sonotrode 12 and when the junction 32 between the electrically conductive elements 34 has been positioned between the two strips of material 24, the sonotrode 12 of which the lower portion is shown in FIG. 1 is moved towards the anvil 10 in the direction indicated by the arrow B. As a result of such movement, the two strips of material 24 and the junction 32 come to lie in the space defined by the co-operation of the respective recesses 14 and 16, with the strips of material 24 being pressed around the junction 32. During that pressing operation, with the apparatus being operative to produce its ultrasound welding operation, the layers 28 which face towards each other and towards the junction 32 soften at least to such an extent that they at least substantially fill the space between the junction 32 and the two outer layers 26 of the respective strips of material 24, with the outer layers 26, which have the higher melting temperature, sealingly enclosing the junction 32 and thus sealing it off relative to the exterior.

Reference may be made to FIGS. 3 and 4 showing a sealingly enclosed junction 32 between electrically conductive elements 34 which are in the form of stranded wires with insulation thereon. FIG. 4 shows for example the configuration of the junction 32 with the sheathing therearound, more particularly the sheathing comprising outer layers 26 sealingly enclosing the respective layers 28 which have filled the space and cavities between the outside surface of the junction 32 and the inside surface of the outer layers 26.

In the embodiment described herein, the end portions of the electrically conductive elements 34 are joined together by an ultrasound welding operation so that the junction 32 does not have any soldering material or other aid to making the junction. It will be appreciated however that the junction between the electrically conductive elements may be made in other ways.

Reference will now be made more particularly to FIG. 2 which shows that the layer 28 of each strip of material 24, being the layer which is towards the junction 32 and which has the lower melting temperature, is of narrower width than the layer 26 which forms the outer layer and which has the higher melting temperature. It will further be seen from FIG. 2 that the inner layer 28 is so arranged relative to the outer layer 26 that the outer layer 26 projects laterally beyond each side edge of the layer 28, by an at least substantially equal amount. It will further be noted that the two layers 26 and 28 of each strip of material 24 are joined together to form a one-piece or integral strip, with the inner layer 28 preferably being in the form of a coating on the outer layer 26 which has the higher melting temperature. That configuration of the sheathing material 24 gives the advantage that, after the two portions of strip material 24 have been pressed together around the junction 32 between the electrically conductive elements 34, the two layers 28 completely fill the space between the outside surface of the junction 32 and the inside surfaces of the two layers 26, as indicated above, while at the same time the free edge regions 36 at the locations where the layers 26 project beyond the respective side edges of the inner layers 28 come to bear snugly and sealingly against the insulation on the electrically conductive elements 34. Thus, the material of the inner layers 28 forms a snug cavity-free enclosure around the bared portions of the electrically conductive elements 34, while the outer layers 26, in addition to forming a sealing encasing means around the junction and the inner layers 28, also cooperate with the outside surfaces of the insulation on the respective elements 34 to seal the sheathing to the elements 34, at respective ends of the junction sheathing. As indicated, FIGS. 3 and 4 show the finished condition of the sheathing.

Referring now again to FIG. 2, it will be seen therein that the recess 16 in the lower end of the sonotrode 12 has a plurality of grooves or corrugations as indicated at 52, which extend in the transverse direction of the recess 16. The transverse corrugations or grooves 52 in the recess 16 prevent the strip of sheathing material 24 from slipping sideways during the operation involving pressing the sheathing material around the junction 32. Corresponding grooves or corrugations may also be provided in the recess 14 in the anvil 10.

It will further be seen from FIG. 2, as well as from FIG. 1, that the material 24 in strip form is fed to the junction 32 to be sheathed thereby in a direction which is at least substantially perpendicular to the longitudinal direction of the junction. After the strip of material has been pressed around the junction by an ultrasound welding operation, the edges of the strips of material are cut off laterally beside the junction in the transverse direction of the strip, as by edges as indicated at 50 in FIG. 1. The cut edges of the strips of material can be clearly seen from the cross-sectional view of the sheathed junction shown in FIG. 4.

In an alternative form of the process of the invention, instead of first and second strips of sheathing material 24 being supplied to the junction to be pressed therearound by an ultrasound welding operation, the sheathing material may be wound around the junction in an appropriate manner.

It will be appreciated that the process may be carried into effect using any suitable compositions of material for making up the sheathing material 24. Preferably, the material constituting the outer layer 26 of each strip of material 24 is of greater hardness than the material constituting the inner layer 28 which has the lower melting temperature. For example, the outer layer of material may be a hardened polyvinyl chloride with a hardness value of 90±5 Shore A, while the inner layer 28 may be a temperature-resistant soft polyvinyl chloride with a hardness value of 50±5 Shore A. At least the outer layer 26 may be transparent to assist with quality control in respect of the internal configuration of the sheathing, while the inner layer may be transparent or colored, the latter further assisting with quality control in that the extent to which the inner layer of material has filled the space between the outer layer and the electrically conductive element 34 can be readily ascertained by considering the extent to which the coloration of the material of the inner layer has permeated the interior of the sheathing.

It will be appreciated that the above-described process and material have been set forth solely by way of example of the present invention and that various modifications and alterations may be made therein without thereby departing from the scope of the present invention.

I claim:

1. A method of joining and sealingly enclosing conductive end portions of a plurality of electrical conductors each of the type including an elongated conductive wire surrounded by an electrically nonconductive covering except at a stripped end portion thereof, the method comprising the steps of mechanically joining the stripped end portions to each other to form an elongated electrically conductive junction;

forming an enclosing material including two elongated strips of polyvinyl chloride material bonded together to form an inseparable single strip of sheathing material, the polyvinyl chloride material of the two strips having different softening temperatures;

placing two portions of elongated strips of the sheathing material on opposite sides of the junction formed by the mechanically joined stripped end portions with the strips of sheathing material extending generally perpendicular to the longitudinal direction of the junction and with the material having the lower softening temperature adjacent the stripped end portions and with the sheathing material overlapping the covering material;

applying pressure and vibratory energy to the outer surfaces of the sheathing material to cause the material with the lower softening temperature to flow around and into the junction until the sheathing material has formed a complete sealing enclosure around the conductive stripped end portions and the adjacent portions of the covering material; and allowing the sheathing material to harden.

2. A method according to claim 1 wherein the vibratory energy is ultrasonic energy.

3. A method according to claim 2 and further including, before the step of applying the vibratory energy, clamping the assembly of sheathing material with the junction therebetween between an anvil and a sonotrode to apply pressure to the assembly while vibratory energy is applied.

4. A method according to claim 1 wherein the two portions of sheathing material are placed on opposite sides of the junction by looping a strip of sheathing material around the junction in a generally U-shaped configuration.

5. A method according to claim 1 which includes transversely cutting the strip alongside the junction after hardening.

6. A method according to claim 1 including forming the strip of material having the lower softening temperature narrower than the strip of material having the higher softening temperature, thereby leaving longitudinal edges of the latter exposed for joining to itself and to the covering material.

7. A method according to claim 1 including selecting the material having the higher softening temperature to have a higher Shore hardness than the material having the lower softening temperature.

8. A method according to claim 7 wherein the Shore hardness of the harder material is 90±5 Shore A and the Shore hardness of the softer material is 50±5 Shore A.

9. A method according to claim 1 and including forming the strip with the higher softening temperature with a smoother exposed surface than the exposed surface of said strip with the lower softening temperature.

10. A method according to claim 1 and including forming said strip of material with the lower softening temperature as a coating on the strip of material having the higher softening temperature.

11. A method according to claim 1 wherein at least said material with the higher softening temperature is transparent.

* * * * *